(12) United States Patent
Gustavsson et al.

(10) Patent No.: US 6,721,568 B1
(45) Date of Patent: Apr. 13, 2004

(54) ADMISSION CONTROL IN A MOBILE RADIO COMMUNICATIONS SYSTEM

(75) Inventors: Pär Gustavsson, Linköping (SE); Jens Bergqvist, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/437,225

(22) Filed: Nov. 10, 1999

(51) Int. Cl.[7] .................................................. H04Q 7/20
(52) U.S. Cl. ...................... 455/450; 455/452.2; 370/331
(58) Field of Search ............................... 455/450, 451, 455/453; 370/329, 331, 333, 335

(56) References Cited

U.S. PATENT DOCUMENTS

| | | |
|---|---|---|
| 5,247,701 A | 9/1993 | Comroe et al. |
| 5,471,671 A | * 11/1995 | Wang et al. ............. 455/226.2 |
| 5,491,837 A | * 2/1996 | Haartsen ....................... 455/62 |
| 5,664,006 A | 9/1997 | Monte et al. |
| 5,732,077 A | 3/1998 | Whitehead |
| 6,131,035 A | * 10/2000 | Ohkubo et al. ............. 455/450 |
| 6,154,655 A | * 11/2000 | Borst et al. ................. 455/451 |
| 6,246,881 B1 | * 6/2001 | Parantainen et al. ........ 455/450 |

FOREIGN PATENT DOCUMENTS

| | | |
|---|---|---|
| EP | 0 889 663 A | 1/1999 |
| WO | 98/36600 A | 8/1998 |

* cited by examiner

*Primary Examiner*—Vivian Chin
*Assistant Examiner*—Lewis G West
(74) *Attorney, Agent, or Firm*—Nixon & Vanderhye, P.C.

(57) ABSTRACT

Admission control procedures compensate for delays between radio resource grants and releases using predicted measurement values to permit more accurate admission control procedures in a mobile radio communications system. Initially, a measurement value of a radio-related parameter is obtained. The effect a requested radio resource or a recently allocated or de-allocated radio resource will likely have on the measurement value of the radio-related parameter is estimated or predicted. A determination is made whether to allocate additional radio resources based on the measurement value and on the estimated effect. The estimation time period is based on an interval between the time of allocating/de-allocating a radio resource and the time of detecting the effect of that allocated or de-allocated resource on the measurement value.

24 Claims, 5 Drawing Sheets

ADMISSION CONTROL IN A MOBILE RADIO COMMUNICATIONS SYSTEM

FIELD OF THE INVENTION

The present invention relates to admission control in a mobile radio communications system.

BACKGROUND AND SUMMARY OF THE INVENTION

In a mobile radio communications system, a mobile radio station communicates over an assigned radio channel with a radio base station. Several base stations are connected to a switching node which is typically connected to a gateway that interfaces the mobile communications system with other communication systems. A call placed from an external network to a mobile station is directed to the gateway, and from the gateway through one or more switching nodes to a base station which serves the called mobile station. The base station pages the called mobile station and establishes a radio communications channel. A call originated by the mobile station follows a similar path in the opposite direction.

In a spread spectrum, Code Division Multiple Access (CDMA) mobile communication system, spreading codes are used to distinguish information associated with different mobile stations or base stations transmitting over the same frequency band. In other words, individual radio "channels" correspond to and are discriminated on the basis of these codes. Various aspects of CDMA are set forth in one or more textbooks such as "Applications of CDMA and Wireless/Personal Communications," Garg, Vigay K. et al., Prentice-Hall 1997.

Spread spectrum communications permit mobile station transmissions to be received at two or more "diverse" base stations and processed simultaneously to generate one received signal. With these combined signal processing capabilities, it is possible to perform a handover from one station to another without any perceptible disturbance in the voice or data communications. This kind of handover is typically called diversity handover and may include "soft" handover between two base stations and "softer" diversity handover between two different antenna sectors connected to the same, multi-sectored base station.

The signal propagation loss between a radio transmitter and receiver varies as a function of their respective locations, obstacles, weather, etc. As a result, large differences may arise in the strength of signals received at the base station from different mobiles. In addition, signals received by a base station from a mobile station close to the base station are much stronger than signals received from other mobile stations located in the base station's cell boundary. Because all users of a CDMA communications system transmit information using the same frequency band at the same time, each user's communication interferes with the communications of the other users. In fact, if one mobile station transmits at a power output that is too large, the interference it creates degrades the signal-to-interference ratio signals received from other mobile radios to the point that the receiving base station cannot correctly demodulate transmissions from the other mobile radios. Another problem with transmitting with too much power is the so-called "party effect." If the mobile transmits at too high of a power level, the other mobiles may increase their respective power levels so that they can "be heard" compounding the already serious interference problem.

Thus, while transmit power control is important in any mobile radio communications system, it is particularly important to the performance and capacity of a CDMA-based mobile radio communications system. Two radio-related parameters, among others, affect the capacity of a CDMA-based system: the uplink (from mobile station-to-base station) interference received in a radio base station and the downlink (from base station-to-mobile station) power sent out by the radio base station. The uplink interference level includes the sum of all radio beams that reach a receiver in the base station for a specific radio frequency carrier. Such radio beams include those transmitted by mobile stations that are located in cells assigned to that base station or in neighboring cells handled by other base stations. Of course, additional noise and pseudo-noise contributes to the received interference level.

Because of the importance of these parameters to the capacity of the radio network, a radio network controller receives measurement reports from one or more radio base stations including periodic uplink interference and downlink power measurements. These measurement reports may be used by a call admission control function of the radio network controller. For example, in response to requests to set up a new call connection or to add radio resources to an existing call connection to a mobile station, the call admission control function determines, for example, if current interference levels in a base station cell where the mobile station is located permit the addition of the new call or the addition of new resources to an existing call. If the downlink power and uplink interference levels are sufficiently low, the admission control function may "admit" the new call request and allocate the appropriate radio resources assuming other conditions are met, e.g., there are sufficient radio resources currently available.

In practice there is a delay between the time when a request for additional radio resources or a request to release radio resources is granted and the time when the effect of that radio resource grant/release is reflected in the base station measurement reports provided to the radio network controller. As a result of this delay, there is a risk that admission control decisions are based on old measurement values that are no longer accurate. This risk is heightened when many requests for (or releases of) radio resources come at substantially the same time, e.g., when a subway train with many users enters a new cell.

It is an object of the present invention to overcome the above-described difficulties and to provide a more accurate admission control procedure based on measurement reports made by the radio base stations.

It is another object of the present invention to provide an admission control algorithm that compensates for delays between radio resource grants/releases and the time when the effect of such grants/releases are reflected in base station measurement reports using predicted measurement values.

It is a further object of the present invention to provide an admission control memory that permits combination of actual measurement values with predicted measurement values resulting in more accurate admission control.

These and other objects are accomplished using admission control procedures in accordance with the present invention. Initially, a measurement value of a radio-related parameter is obtained. The effect that a requested radio resource or a recently allocated or de-allocated radio resource will likely have on the measurement value of the radio-related parameter is estimated or predicted. A determination is made whether to allocate additional radio resources based on the measurement value and on the estimated effect. The estimation time period is based on an interval between the time of allocating/de-allocating a radio resource and the time of detecting the effect of that allocated or de-allocated resource on the measurement value. Alternatively, the estimation time period may be based on a previously-allotted measurement time cycle.

In a non-limiting, example embodiment, one radio-related parameter is uplink interference at the radio base station. Another parameter may be downlink base station transmit power. Alternatively, measurement values of plural radio-related parameters, e.g., both uplink interference and downlink base station transmit power, may be employed. The measurement value(s) is (are) stored along with a corresponding estimated or predicted value. Corresponding stored values are combined to provide a modified measurement value from which a more accurate resource allocation decision can be made. The estimated or predicted value is removed, replaced, or ignored in the admission control memory after the estimation time period expires.

As a result of the admission control procedures in accordance with the present invention, the quality of already-established call connections is not adversely impacted by the allowance of new calls or the allocation of additional resources in already overloaded situations. This kind of predicted control is especially significant where many new call setup or other requests/releases for radio resources are received within a very short time period. Admission control is also improved in close to overload situations, and again, particularly when many call resource allocation/de-allocation requests are received in a relatively short time period. Consequently, the predictive nature of the present invention permits the admission control to more accurately maximize the number of calls that can be setup without undesirable performance degradation.

BRIEF DESCRIPTION OF THE DRAWINGS

The foregoing and other objects, features, and advantages of the invention will be apparent from the following description of preferred example embodiments as well as illustrated in the accompanying drawings in which reference characters refer to the same parts throughout. While individual functional blocks and components are shown in many of the figures, those skilled in the art will appreciate these functions may be performed by individual hardware circuits, by a suitably programmed digital microprocessor or general purpose computer, by an application specific integrated circuit (ASIC), and/or by one or more digital signaling processors (DSPs).

DETAILED DESCRIPTION OF THE DRAWINGS

In the following description, for purposes of explanation and not limitation, specific details are set forth, such as particular embodiments, network architectures, signaling flows, protocols, techniques, etc., in order to provide an understanding of the present invention. However, it will be apparent to one skilled in the art that the present invention may be practiced in other embodiments that depart from these specific details. For example, although the present invention is disclosed in the example context of mobile radio communications, it may also be employed in other communications systems where communication resources are managed. In other instances, detailed descriptions of well-known methods, interfaces, devices, protocols, and signaling techniques are omitted so as not to obscure the description of the present invention with unnecessary detail.

Figure 1:
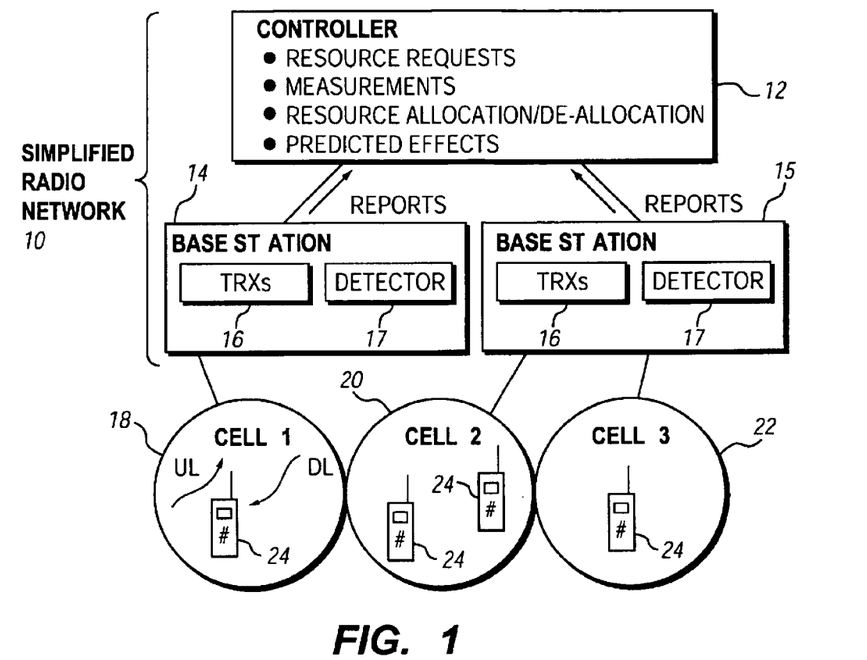
FIG. 1 is a simplified diagram of a mobile radio communications system in which the present invention may be employed.

FIG. 1 illustrates a simplified radio network 10 in which the present invention may be employed. Those skilled in the art will appreciate of course that the present invention can be implemented in any mobile radio communications system. The simplified radio network 10 includes a controller 12 connected to plural base stations 14 is associated with one or more cell areas. For example, base station 14 is associated with one cell 18, and base station 15 is associated with two cells 20 and 22, e.g., sector cells. The mobile stations 24 receive downlink (DL) signals from a base station associated with the cell in which the mobile station is currently located and transmits signals in the uplink (UL) direction to that base station.

Each base station 14 and 15 typically contains a plurality of transceivers 16 and may include measurement or other detection circuitry 17 for detecting total downlink transmit power and uplink interference levels in each of its cells. Each base station 14 and 15 sends periodic measurement reports to the controller 12. Using these reports, the controller 12 receives, analyzes, and stores various measurement data for each cell. The controller 12 also receives various radio resource requests, and in response, makes radio resource allocations and de-allocations based on predicted effects of those radio resource allocations on one or more of the measured parameters in the cells as will be described in further detail below.

Figure 2:
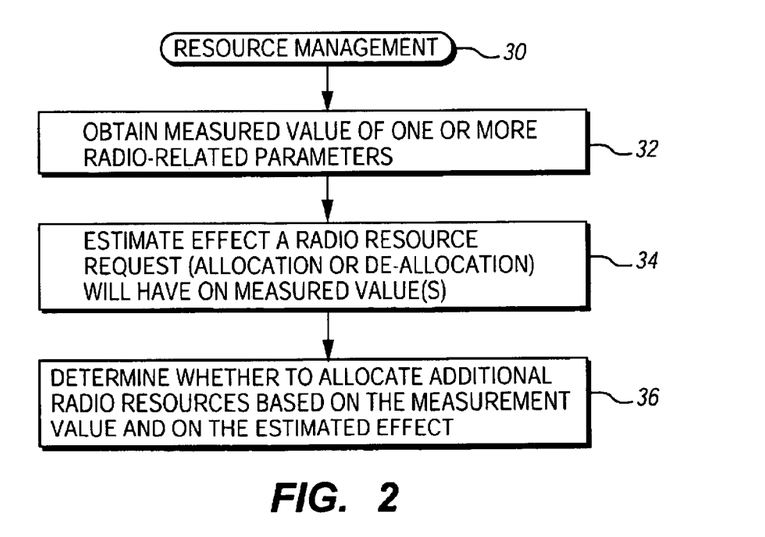
FIG. 2 is a Resource Management method in accordance with one example embodiment of the present invention.

FIG. 2 illustrates a Resource Management method (block 30) in accordance with one example embodiment of the present invention. One (or more) measured values of one or more radio related parameters is obtained and provided to the controller 12 (block 32). Example parameters include uplink interference received at the radio base station and/or the downlink power sent out by the radio base station. The controller 12 estimates the effect that a recent radio resource request (either allocation or de-allocation) will have on the measured radio-related parameter value(s) (block 34). The radio resource request may have already been granted or it may be currently under consideration. An example, non-limiting radio resource includes radio channels, which in a CDMA-based mobile communications system corresponds to one or more spreading codes. Of course, the present invention can be applied to any radio or other resource whose allocation and/or de-allocation is controlled. For example, processing resources for handling different radio protocol layers associated with the radio channel are allocated and de-allocated. Examples of the radio protocol layers are Medium Access Control (MAC), Diversity Handover (DHO), and Radio Link Control(RLC). The controller 12 then determines whether to allocate one or more additional radio resources, e.g., in response to a request for radio resources either for a new or an existing user connection, based on the measured value(s) of the one or more radio-related parameters and on the estimated effect determined in block 34 (block 36).

The predictive capability of the inventive resource management method prevents the quality of already-established call connections from being adversely impacted by the allocation of additional resources in overloaded situations. This kind of predictive control is particularly significant when there are multiple new resource requests received in a very short time period, e.g., when a subway train with many users enters a new cell. On the other hand, resources may be allocated more promptly and more accurately in appropriate situations so that capacity can be maximized without unnecessary measurement delays. For example, if a number of resources have been recently released, those resources can be reallocated before their impact is detected in a measurement report.

Figure 3:
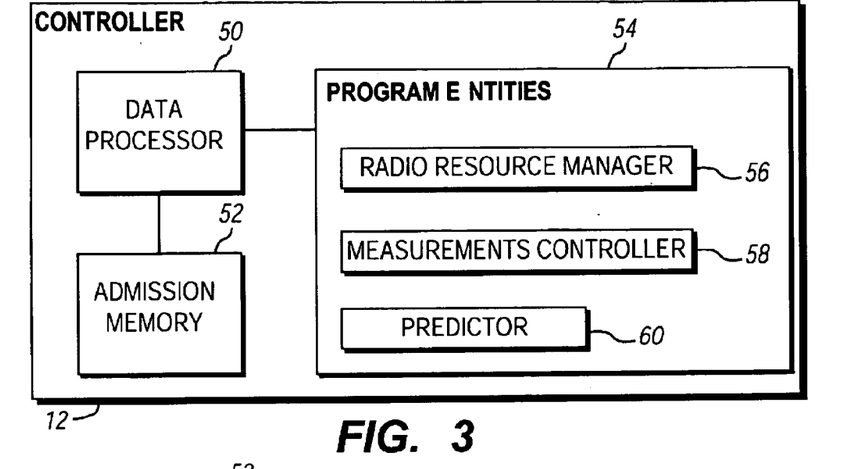
FIG. 3 is a simplified function block diagram of a radio network controller shown in FIG. 1.

A more detailed, example, non-limiting embodiment is now described in conjunction with FIGS. 3–6. FIG. 3 illustrates in function block format functional entities within the controller 12. A data processor 50 is coupled to an admission memory, described further in conjunction with FIG. 4, and to various program or software-driven entities 54 including a radio resource manager 56, a measurements controller 58, and a predictor 60. These software-driven entities 56–60 implement their functionality via the data processor 50 and the admission memory 52. In particular, the radio resource manager 56 receives and responds to requests to allocate new radio resources, e.g., spreading codes in a CDMA-based system, for existing user connections or for new user connections as well as to de-allocate resources for user connections that no longer need them or are released. The measurements controller 58 receives measurement reports from the various base stations 14 and 15 and stores that information via the data processor 50 in the admission memory 52 as described in further detail with regard to FIG. 4. The predictor 60 predicts the effect that newly allocated or de-allocated radio resources would or will have in each base station cell. That predicted effect may then be taken into account by the radio resource manager 56 in its decisions regarding whether or not to allocate further radio resources in response to resource requests.

Figure 4:
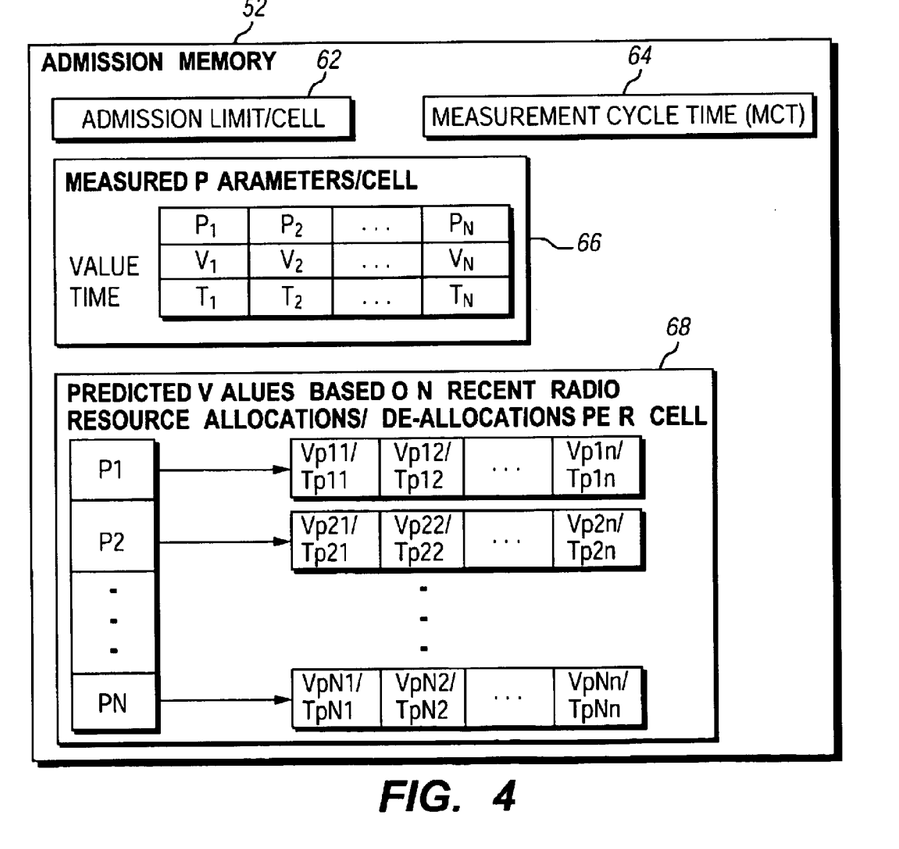
FIG. 4 is a function block diagram illustrating example data and data structures contained in the admission memory used in the radio network controller.

The admission memory 52, configured for example as shown in FIG. 4, stores a number of different parameters and times. For example, the controller 12 may store in the admission memory 52 an admission limit or maximum parameter value(s) for each base station cell 62, e.g., a maximum interference level permitted in the cell. A measurement cycle time 64 is also stored for each base station cell corresponding to how frequently measurement reports from each base station are provided to the controller 12 including for example the amount of uplink interference detected at the base station and/or the downlink power transmitted by the radio base station. The admission memory 52 also contains a measured parameter array for each base station cell 66. The array includes for each parameter value $P_1, P_2 \ldots PN$ a corresponding value $V_1, V_2 \ldots V_N$ and time $T_1, T_2 \ldots T_N$. For example, the measured parameter value $V_1$ may correspond to an uplink interference level in that particular cell at the actual measurement time $T_1$.

Also stored in the admission memory 52 is a predicted value array 68 of predicted delta values associated with recent radio resource allocations/de-allocations for each cell. The measured parameters $P_1, P_2 \ldots P_N$ included in the measured parameters array 66 have corresponding parameters $P_1, P_2 \ldots P_N$ in the predicted value array 68. N is the number of parameters, and in the example embodiment, is two for uplink interference and downlink power level. For each parameter P in the predicted value array 68, there is one or more predicted value(s) $V_{P11}, V_{P12} \ldots V_{P1n}$ along with a corresponding time value $T_{P11}, T_{P12} \ldots T_{P1n}$, where "n" is a resource allocation number. The resource allocation number "n" corresponds to the number of resource requests that have not yet started to affect the values in the most recently received measurement reports. For a general case, "n" may be different for different parameters. In the non-limiting example using uplink interference and downlink power level, "n" is preferably the same. The time value $T_{P1n}$ is the time at the reception of the resource allocation request number "n" affecting parameter "1." Each predicted value is related to one allocation/de-allocation request belonging to one mobile station. Since several mobile stations may request resources at more or less the same time, it is preferable if those requests are stored and processed separately in array 68 for each parameter. For example, a value $V_{P11}$ indicates the predicted delta value caused by a radio resource allocation/de-allocation. The stored time value $T_{P11}$ is set to the time when the radio resource allocation/de-allocation request is received. A predicted value in the predicted value array 68 is removed or ignored when the effect of the allocation/de-allocation can be foreseen to be included in a base station measurement report. Again, although several parameters are shown for purposes of illustration, only one (or two) parameter(s) may be used, e.g., uplink interference (or uplink interference and downlink power).

Figure 5A:
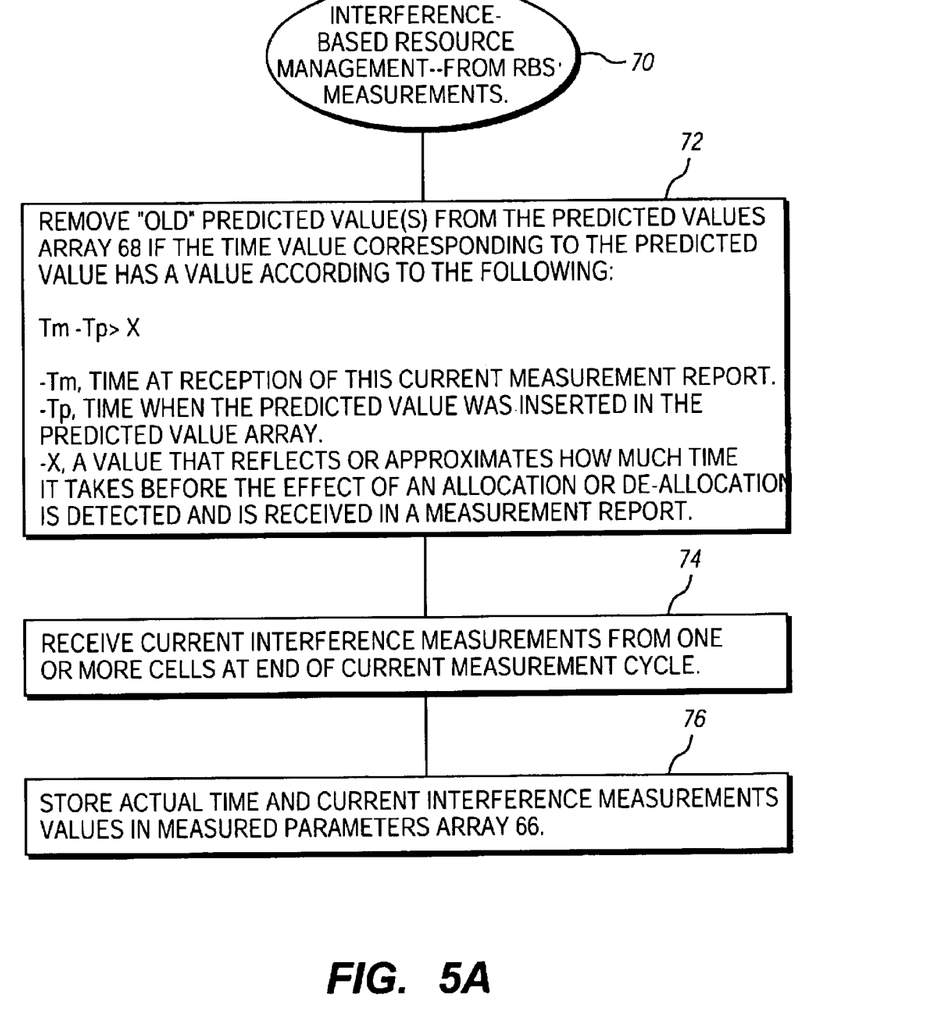
FIGS. 5A and 5B are flowcharts showing Interference-Based Resource Management procedures relating to base station measurement reports and radio resource allocation/de-allocation requests, respectively, in accordance with one example implementation of the present invention.
Figure 5B:
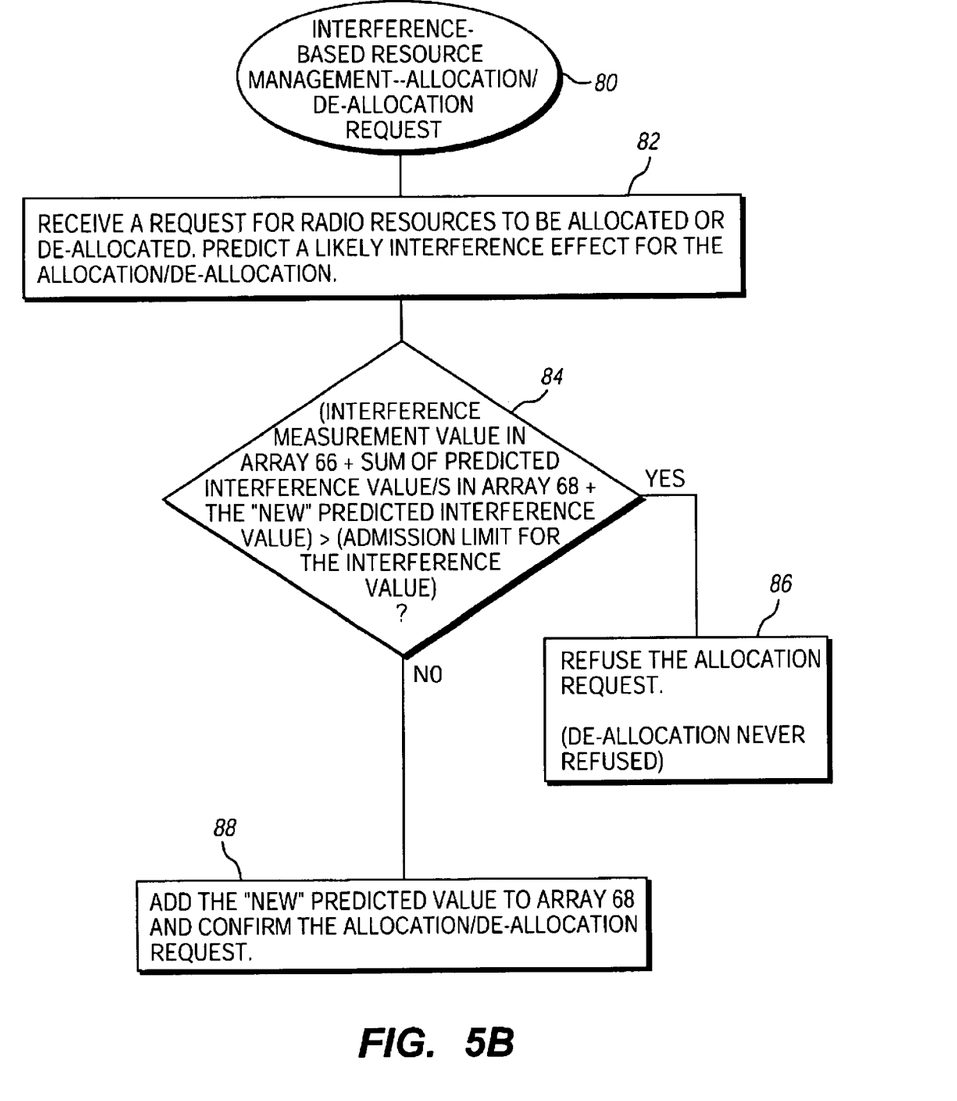

In this regard, FIGS. 5A and 5B illustrate an interference-based resource management method in accordance with one example embodiment of the present invention. FIG. 5A illustrates an example interference-based resource management method relating to receiving interference measurement reports from radio base stations (block 70). Initially, "old" predicted value(s) from the predicted values array 68 are removed, overwritten, or ignored if the following is satisfied:

$$T_M - T_P > X$$

where $T_M$ is the time the current measurement report was received stored in array 66, $T_P$ is the time when the predicted value was inserted in the predicted value array 68, and X is a value that reflects or approximates how much time it takes for the effect of an allocation or de-allocation to be detected and received in a measurement report(block 72). The current interference measurements, e.g., uplink interference measurements detected by each base station, are then obtained by the measurements controller 58 for one or more cells at the end of each measurement cycle (block 74). These measurement values along with the time when the measurements were received are stored in the measured parameters array 66 in the admission memory 52 (block 76).

FIG. 5B illustrates an example interference-based resource management method relating to receiving and handling requests to allocate or de-allocate radio resources (block 80). A request is received for radio resources to be allocated or de-allocated, e.g., a new call connection. The likely interference effect of such an allocation or de-allocation is predicted and stored in the predicted values array 68 in the admission memory 52 (block 82). The likely interference effect may be predicted in the following example manner. Assume that the received uplink interference level in the radio base station is proportional to the total bandwidth of all uplink channels received at the base station. With this assumption, an interference-to-bandwidth ratio is established as follows: (received uplink interference measurement)/(total bandwidth for all uplink channels). The predicted interference value is then determined as: (the interference-to-bandwidth ratio)×(bandwidth for the new allocation/de-allocation request). A similar assumption may also be made when downlink power level is a measured parameter. Assume that the transmission power at the radio base station is proportional to the total bandwidth of all downlink channels that exist between the radio base station and mobile stations. With this assumption, a power-to-bandwidth ratio is determined as: (the total transmit power level)/(the total bandwidth for all down link channels between radio base station and mobile stations). The predicted additional power level for a newly requested radio resource is calculated as: (the power-to-bandwidth ratio)× (the bandwidth for the new allocation/de-allocation request).

Returning to FIG. 5B, the resource manager 56 combines the current interference measurement stored in the measurements array 66 with the sum of any unexpired, predicted interference value(s) in the predicted values array 68 and the newly predicted interference value for one or more cells (block 84). If that combined value exceeds an admission limit for the interference value, the received resource allocation request is denied (block 86). A resource de-allocation is not refused. If the combined value does not exceed the admission limit for the interference value, the new predicted value is added to the predicted values array 68, and the allocation/de-allocation request is granted (block 88).

Figure 6:
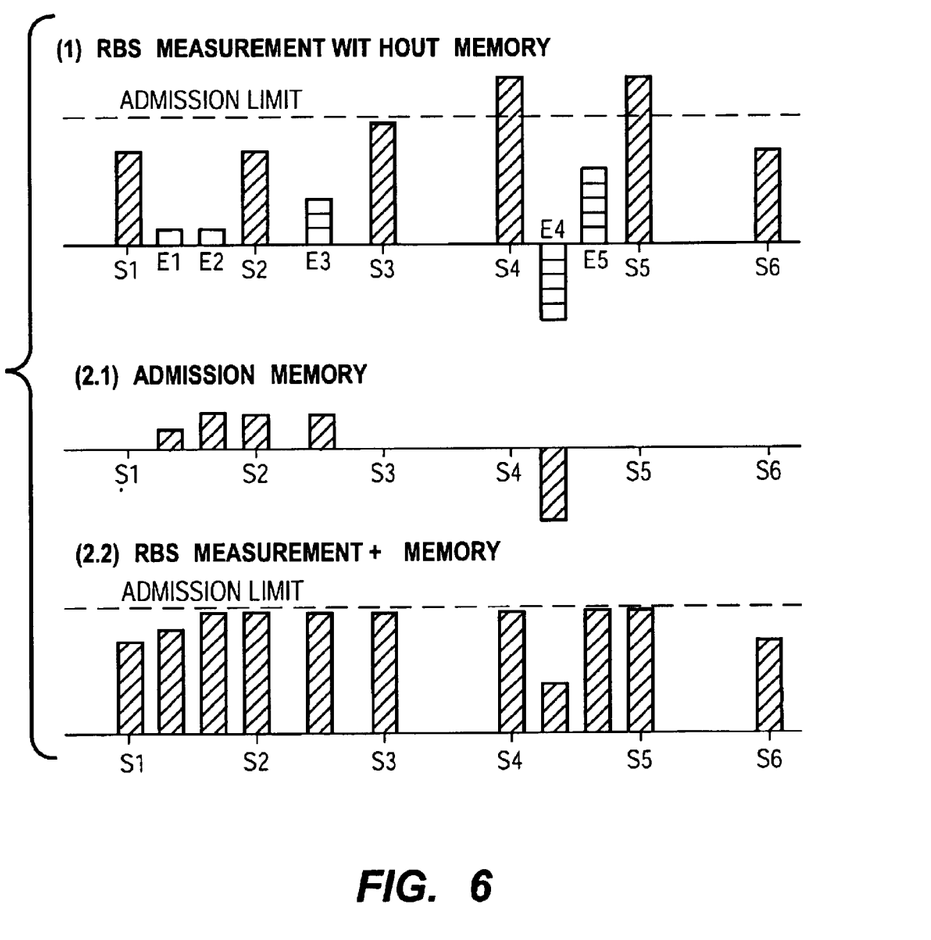
FIG. 6 is an illustrative example of admission control both without and with the benefit of the present invention.

The resource management method is illustrated by a non-limiting example shown in FIG. 6. The first bar graph, i.e., "(1) RBS measurement without memory," illustrates resource management without the benefit of the present invention. The invention is employed in bar graphs (2.1)–(2.2). When the actual parameter measurements for the cell are received and stored in the measured parameters array 66, any expired predicted parameter values $V_p$ in the predicted value array 68 are replaced, erased, or ignored. Accordingly, predicted values for older, "expired" radio resource allocations are not taken into account in the admission control decisions since their influence should be reflected in the measured parameter values. In FIG. 6, S1–S6 correspond to times at which a measurement report is received from the radio base station for the cell in question; E1–E5 correspond to events where radio resources are added or released.

Turning to the bar graph under Section (1) entitled "RBS Measurement Without Memory," a cell measurement report is provided from a base station that shows the measured parameter, e.g., interference in this example, is below the admission interference limit. Two additional resources are allocated in that base station cell at E1 and E2. At the time the next measurement report is received at S2, the impact of the allocation of the two new resources at E1 and E2 has not yet been detected by the base station, and therefore, is not reflected in the measurement report at S2. As a result, three report from the base station, the allocations of the radio resources at E1 and E2 are reflected in that report indicating that the measured interference is nearly at the admission limit.

At the next measurement report S4, the three newly-allocated resources are reflected in that S4 report which now shows that the measured interference level exceeds the cell's admission interference limit level. However, at event E4, five radio resources are de-allocated. Shortly thereafter, and before the next measurement event, there is a request for five new radio resources at E5. Because the measurement report at S4 does not reflect the five returned resources, the radio resource manager 56 rejects the resource requests at E5 based on the measurement report at S4. Thus, even though the resource request events at E4 and E5 cancel each other, the time delay associated with detecting and conveying that information to the resource manager 56 prevents an accurate assessment of the current interference level at the base station cell. The measurement report at S5 also does not reflect the resource allocation/de-allocation activity at E4 and E5. Finally, the measurement report at S6 reflects the return of the five resources from event E4 bringing the measured interference level back below the admission limit. Recall that the requests at E5 were denied based on the outdated measurement report at S4.

Bar graphs (2.1–2.2) show an example use of an admission memory in accordance with the invention. At events E1 and E2, the predicted (as opposed to actually measured) interference contribution for the two newly allocated radio resources at E1 and E2 and the times of reception of the allocation or de-allocation requests at E1 and E2 are added to the admission memory in the predicted value array 68. As shown in the bar graph (2.2) entitled "RBS Measurement Plus Memory," the measurement report S1 is combined with the estimated effect stored in the admission memory so that the measurement report at S2 reflects the predicted interference contribution of the radio resources newly allocated at E1 and E2. Accordingly, the bar graph at S2 indicates that the admission limit for the cell is nearly reached. The request to add three additional radio resources at event E3 is therefore rejected by the radio resource manager 56, which means the value of the admission memory does not change at event E3.

At event E4 where five radio resources are released, the admission memory bar graph records a corresponding negative value representing the effect of the release of five resources at E4. The interference value at S4 in bar graph (2.2), (which has not changed since S2), is then decreased at E4. As a result, when a request for five additional resources occurs at E5, the predicted interference value for the cell is below the admission limit. The radio resource manager 56 thus grants the request of the resources at E5 canceling the admission memory value and bringing the combined result back to close to the admission limit values.

While the present invention has been described in terms of a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

What is claimed is:

1. In a mobile radio communications system including a base station associated with a cell and one or more mobile stations, a method comprising:
   determining a current measured parameter value in the cell;
   predicting a future value associated with an event that may impact the measured parameter value;
   combining the current measured parameter value and the predicted value to provide a combined value; and
   making a resource allocation decision based on the combined value.

2. The method in claim 1, wherein the measured parameter value is an interference level in the cell.

3. The method in claim 1, wherein the future value is a predicted interference value.

4. The method in claim 3, wherein the predicted interference value is associated with an amount of interference likely to be caused by a recently allocated radio resource.

5. The method in claim 3, wherein the predicted interference value takes into account an amount of interference likely to be removed as a result of a recently de-allocated radio resource.

6. The method in claim 1, wherein the measured parameter value is a base station transmit power level in the cell.

7. The method in claim 1, wherein the future value is a predicted base station transmit power level.

8. The method in claim 7, wherein the predicted base station transmit power level is associated with an amount of base station transmit power likely to be associated with a recently allocated radio resource.

9. The method in claim 7, wherein the predicted base station transmit power level takes into account an amount of base station transmit power likely to be removed as a result of a recently de-allocated radio resource.

10. The method in claim 1, further comprising:
establishing an admission memory to store the current measured parameter value and the predicted value, and
removing, ignoring, or replacing the predicted value from the admission memory after a predetermined time interval.

11. The method in claim 10, wherein the predetermined time interval corresponds to a delay period before an effect of a recent resource admissions event is likely detectable in the cell.

12. The method in claim 10, further comprising:
detecting an overload condition in the cell based on information stored in the admission memory, and
denying new resource allocation requests until the overload condition abates.

13. The method in claim 10, wherein the combining step includes combining the current measured parameter value, the predicted value, and a predicted value already stored in the admission memory.

14. The method in claim 1, wherein the resource allocation decision includes deciding to allocate a new radio resource in response to a radio resource request.

15. The method in claim 1, wherein the resource allocation decision includes denying a radio resource allocation request.

16. A radio resource management method comprising accepting a new radio resource request in a radio communications system when a combination of a current measured interference value and a predicted interference value based on a recently allocated or released radio resource is less than a threshold interference value and denying a new radio resource request when the combination of the current measured interference value and the predicted interference value is not less than a threshold overload interference value.

17. In a mobile communications system, including a radio network with a base station communicating with mobile stations over a radio interface, a radio network control node comprising:
a memory, and
electronic circuitry configured to perform the following tasks:
storing in the memory a measured radio-related parameter value;
determining an effect of a recently allocated or de-allocated radio resource on the radio-related parameter;
storing a value associated with the determined effect in the memory;
detecting a new radio resource request; and
deciding whether to grant the new radio resource request using the values stored in the memory.

18. The radio network control node in claim 17, wherein the radio network control node is the base station.

19. The radio network control node in claim 17, wherein the radio network control node is a radio network controller coupled to plural base stations.

20. The radio network control node in claim 17, wherein the electronic circuitry is configured further to store in the memory a measured radio-related parameter value and a time value for a cell associated with the base station.

21. The radio network control node in claim 20, wherein the electronic circuitry is configured further to store in the memory predicted values for the radio-related parameter based on recent radio resource allocations or de-allocations for the cell.

22. The radio network control node in claim 17, wherein the electronic circuitry is configured further to remove or replace the predicted value from the memory after a predetermined time interval.

23. The radio network control node in claim 22, wherein the predetermined time interval corresponds to a measurement cycle.

24. The method in claim 23, wherein the predetermined time interval corresponds to a delay period before an effect of a recent allocation or de-allocation of a radio resource is likely detectable in cell associated with the base station.

* * * * *